(12) United States Patent  (10) Patent No.: US 7,621,363 B2
Kinoshita et al.  (45) Date of Patent: Nov. 24, 2009

(54) BODY FRAME OF MOTORCYCLE

(75) Inventors: Yoshiteru Kinoshita, Saitama (JP); Sadataka Okabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 11/699,484

(22) Filed: Jan. 30, 2007

(65) Prior Publication Data

US 2007/0175682 A1  Aug. 2, 2007

(30) Foreign Application Priority Data

Jan. 31, 2006  (JP) .............................. 2006-023255

(51) Int. Cl.
*B62K 11/04* (2006.01)
(52) U.S. Cl. ..................... 180/219; 180/298; 280/281.1
(58) Field of Classification Search ................. 180/219, 180/227, 311, 68.3, 298; 280/281.1, 288.2, 280/288.3, 285; 403/318, 356
See application file for complete search history.

(56) References Cited

U.S. PATENT DOCUMENTS

| | | | | |
|---|---|---|---|---|
| 4,226,296 A | * | 10/1980 | Higaki ......................... | 180/219 |
| 4,508,184 A | * | 4/1985 | Hansen ....................... | 403/318 |
| 4,706,774 A | * | 11/1987 | Tsuboi ....................... | 280/285 |
| 4,887,687 A | * | 12/1989 | Asai et al. ................... | 180/219 |
| 4,984,650 A | * | 1/1991 | Horiike et al. ............... | 180/227 |
| 5,086,866 A | * | 2/1992 | Banjo et al. .................. | 180/219 |
| 5,248,012 A | * | 9/1993 | Kurawaki et al. ........... | 180/219 |
| 5,375,677 A | * | 12/1994 | Yamagiwa et al. .......... | 180/219 |
| 5,887,673 A | | 3/1999 | Matsumura et al. | |
| 6,283,242 B1 | * | 9/2001 | Umeoka et al. ............. | 180/219 |
| 6,695,089 B2 | * | 2/2004 | Adachi et al. ............... | 180/311 |
| 7,188,695 B2 | * | 3/2007 | Miyakawa et al. .......... | 180/219 |
| 7,383,909 B2 | * | 6/2008 | Kawase ...................... | 180/219 |

FOREIGN PATENT DOCUMENTS

JP  2004-256005 A  9/2004

* cited by examiner

*Primary Examiner*—Hau V Phan
(74) *Attorney, Agent, or Firm*—Birch, Stewart, Kolasch & Birch, LLP

(57) ABSTRACT

A body frame for a motorcycle for ensuring the binding rigidity between an engine and a body frame while reducing the weight of the body frame, and also increasing the flexibility of the disposition of motorcycle components. A body frame includes a first frame member and a second frame member, the first frame member and the second frame member being separated relative to each other. At least one engine support is formed integrally with the first frame member. Another engine support and a pivot portion for a rear swing arm is integrally formed with the second frame member. The first frame member gradually expands towards the at least one engine support with three approximately M-shaped projections being formed at an end of the first frame member wherein the at least one engine support is formed at these projections.

16 Claims, 5 Drawing Sheets

BODY FRAME OF MOTORCYCLE

CROSS-REFERENCE TO RELATED APPLICATIONS

The present application claims priority under 35 USC 119 to Japanese Patent Application No. 2006-023255 filed on Jan. 31, 2006 the entire contents of which are hereby incorporated by reference.

BACKGROUND OF THE INVENTION

1. Field of the Invention

The present invention relates to an improvement in a body frame of a motorcycle.

2. Description of Background Art

A mainstream body frame of a motorcycle is composed of left and right main frames formed integrally with a head pipe, whereby an engine is suspended and supported therebetween.

A motorcycle is known which includes left and right main frames wherein part of which can be separated and wherein the engine is suspended and supported therebetween.

A body frame is disclosed in JP-A No. 2004-256005 (FIG. 2) wherein main frames thereof are provided for suspending and supporting the engine and the like.

As illustrated in FIG. 2 of JP-A No. 2004-256005, the frame of a motorcycle is disposed with a front frame 5 and a rear frame 20 being separated from each other. The front frame 5 is mounted on a cylinder block 8 wherein the rear frame 20 is an approximate diamond-shaped frame, as viewed from the side, and is located at the rear of a case 7 constituting an engine 6. Thus, the frame is reduced in size and weight by attaching a rear portion of the case 7 and also a rear swing arm 25 to the frame 20.

According to JP-A No. 2004-256005, if the engine increases in size it is necessary to increase the binding rigidity.

Thus, a technology is desired that enables ensuring a predetermined binding rigidity between the body frame and the engine, while reducing the weight of the body frame including the main frame.

SUMMARY AND OBJECTS OF THE INVENTION

An embodiment of the present invention is intended to ensure the binding rigidity between the engine and the body frame while reducing the weight of the body frame. In addition, according to an embodiment of the present invention a body frame of a motorcycle is provided wherein the components of the vehicle can be arranged more flexibly.

In an embodiment of the present invention, a body frame includes a first frame member and a second frame member. The first and second frame members are disposed separately with the first frame member extending from a head pipe toward a crankcase of an engine. One engine support is formed integrally with the first frame member. The second frame member is located at the rear portion of the engine and has the other engine support and a pivot portion of a rear swing arm, both of which are formed integrally with the second frame member. Approximately M-shaped projections are formed at an end of the first frame member. One engine support is formed at these projections.

In an embodiment of the present invention, a body frame of includes a first frame member and a second frame member with the first and second frame members being disposed separately. The first frame member extends from a head pipe toward a crankcase and has one engine support formed integrally with the first frame member. The second frame member extends from a rear portion of the engine toward the rear of the engine and has the other engine support and a pivot portion of a rear swing arm, both of which are formed integrally with the second frame member. The engine is a multiple-cylinder engine having a front cylinder and a rear cylinder with one engine support supporting at least a front portion of the front cylinder, a rear portion of the rear cylinder, and an intermediate position between the front and rear cylinders.

In an embodiment of the present invention, the engine is a multiple-cylinder engine having a front cylinder and a rear cylinder with the first frame member gradually expanding towards the one engine support and forming three approximately M-shaped projections at one end of the first frame member. The front projection thereof supports a front portion of the front cylinder, the center projection supports an intermediate position between the front and rear cylinders, and the rear projection supports a rear portion of the rear cylinder.

In an embodiment of the present invention, a body frame includes a first frame member and a second frame member with the first and second frame members being disposed separately. The first frame member extends from a head pipe to a crankcase of an engine and has one engine support formed integrally with the first frame member. The second frame member extends from a rear portion of the engine towards the rear of the engine and has the other engine support and a pivot portion of a rear swing arm, both of which are formed integrally with the second frame member. The second frame member is composed of left and right frame portions with a cross portion interconnecting the left and right frame portions being integrally formed below the pivot portion. A first recessed portion is upwardly recessed and is formed at the bottom of the cross portion, so that a muffler can be disposed in the first recessed portion.

According to an embodiment of the present invention, a second recessed portion that is downwardly recessed is formed at the top of the cross portion so as to dispose a power transmission member in the second recessed portion.

In an embodiment of the present invention, since the first frame member is formed to gradually expand towards the end thereof and an approximately M-shape projection is formed at the end thereof as one engine support, it is possible to increase the number of engine support points and thereby easily ensure a predetermined binding rigidity, without having to increase the size of the body frame and without an additional wide stay or the like.

Also, since the approximately M-shaped projection is formed at the end of the first frame member, it is possible to reduce the weight of the body frame and thereby save the cost of production.

In an embodiment of the present invention, the one engine support is constructed to support at least the front portion of the front cylinder, the rear portion of the rear cylinder, and a portion between the front and rear cylinders.

Since the one engine support can support extensively the front and rear portions of the engine and the portion in between, it is possible to effectively support the engine, and effectively ensure the binding rigidity particularly for a laterally long multiple-cylinder engine.

In an embodiment of the present invention, since the first frame member is formed to gradually expand and three approximately M-shape projections are formed at the end thereof as one engine support, it is possible to easily ensure the extent of supporting the engine without having to increase the size of the body frame.

Accordingly, it is possible to reduce the weight of the body frame without increasing the size thereof, while easily ensuring the binding rigidity.

In addition, since three projections are provided at the end of the first frame member in order to support the front portion of the front cylinder, the rear portion of the rear cylinder, and a portion between the front and rear cylinders, it is possible to effectively increase the binding rigidity of the engine.

Since the first frame member makes it possible to easily ensure the extent of supporting the engine, it is possible to effectively ensure the binding rigidity between the engine and the body frame, even for a relatively bulky multiple-cylinder engine.

In an embodiment of the present invention, since the first recessed portion that is upwardly recessed is formed under the cross portion that is formed integrally with the second frame member, it is possible to increase the flexibility in the disposition of the muffler.

With an increase in the flexibility in the disposition of the muffler, an optimal disposition of the muffler with a weight distribution taken into consideration can be achieved.

In an embodiment of the present invention, since the second recessed portion is formed at the cross section to pass the power transmission member through the second recessed portion, it is possible to effectively dispose the muffler and the power transmission member.

Making it possible to effectively dispose the muffler and the power transmission member achieves a disposition with high space efficiency and good weight balance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
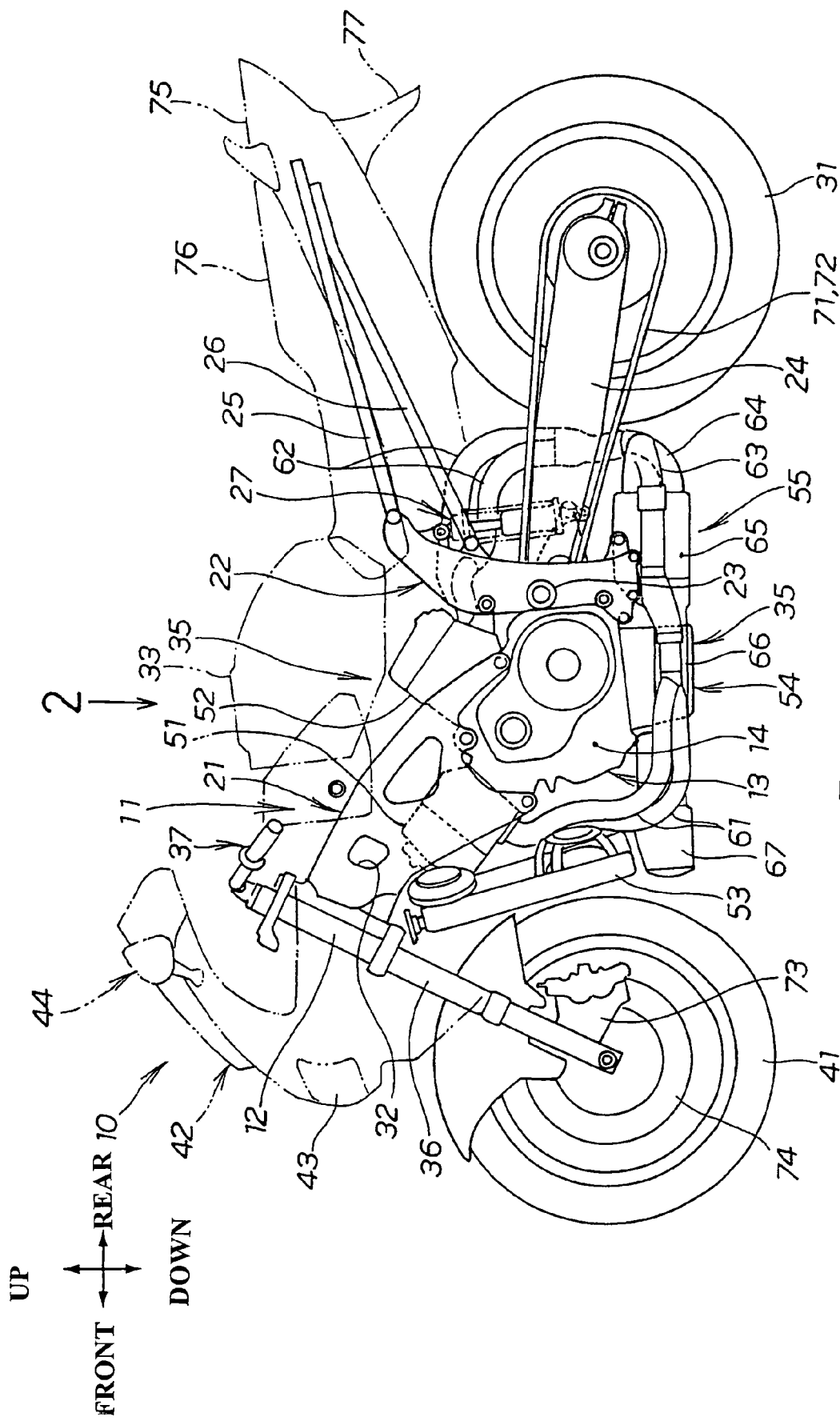
FIG. 1 is a side view illustrating the body frame of a motorcycle according to the present invention.

Best modes for carrying out the present invention are described below with reference to the accompanying drawings. In the drawings, the terms front, rear, above, below, left, and right indicate the directions as viewed from the rider. Also, the drawings are to be viewed in the direction of the reference numerals.

FIG. 1 is a side view illustrating a body frame of a motorcycle according to the present invention, wherein the motorcycle 10 has a body frame 11. The body frame 11 includes a head pipe 12 provided on a front end with a first frame member 21 extending from the head pipe 12 toward a crankcase 14 of an engine 13. A second frame member 22 extends up and down from the rear of the engine 13 at a rear portion of the engine 13. A pivot portion 23 is formed integrally with the second frame member 22. A rear swing arm 24 is vertically-swingably formed at the rear of the pivot portion 23 with a seat rail 25 extending obliquely upwardly on the rear of the second frame member 22. A support frame 26 supports the seat rail 25.

In addition, a rear shock absorber 27 is mounted between the second frame member 22 and the rear swing arm 24, and a rear wheel 31 is rotatably mounted as a drive wheel at the rear end of the rear swing arm 24.

Also, a through-hole 32 is formed as a ram air duct in the first frame member 21, with a fuel tank 33 being disposed obliquely upwardly on the rear thereof.

A power unit includes the engine 13 that is provided between the first frame member 21 and the second frame member 22. Thus, the power unit 35, as a source of power, serves as a part of the body frame 11.

The motorcycle 10 includes a front fork that is steerably mounted to the head pipe 12 with a steering handlebar 37 being mounted at the upper end of the front fork 36. A front wheel 41 is mounted at the lower end of the front fork 36. To the head pipe 12, a cowl member 42 is attached that covers the font portion of the body frame 11 for the purpose of wind shielding or the like. A headlight 43 and rearview mirrors 44 are mounted on the cowl member 42.

The engine 13 is suspended and supported at the approximately center of the body frame 11. The engine 13 is a transverse-mounted V4 cylinder engine wherein a front cylinder 51 and a rear cylinder 52 intersect with each other in a V-shaped around the crankcase 14.

A radiator unit 53 is disposed in front of the engine 13 with an oil pan 54 being disposed below the engine 13 that projects downwardly. In the vicinity of the oil pan 54 the muffler 55 is disposed.

The muffler 55 is mainly composed of a rear expansion chamber 65 disposed at the rear of the oil pan 54 of the engine 13, and a front expansion chamber 67 disposed in front of the oil pan 54.

Exhaust pipes 61, 61 extend downwardly from the front cylinder 51 of the engine 13 and are joined at the rear of the engine 13 and then connected to the rear expansion chamber 65 via a U-tube 63.

In addition, exhaust pipes 62, 62 extend downwardly from the rear cylinder 52 of the engine 13 are joined at the rear of the engine 13 and are then connected to the rear expansion chamber 65 via a C-tube 64.

A manifold 66 interconnects the rear expansion chamber 65 and the front expansion chamber 67.

Thus, an exhaust gas entering the rear expansion chamber 65 via the exhaust pipes 61, 62 passes through the rear expansion chamber 65, moves from the rear expansion chamber 65 to the front expansion chamber 67, passes through the front expansion chamber 67, for a process of purification and noise reduction, and then is discharged outside.

A chain 71 is a power transmission member 72 for transmitting the power from the engine 13 to the rear wheel 31. A front brake unit 73 is mounted on the front fork 36. A front brake disc 74 is mounted on the front wheel 41. The front brake unit 73 is disposed at a position where it acts on the front brake disc 74.

A rear cowl 75 is provided for covering around the seat rail with a pillion seat 76 being provided above the seat rail. A rear fender 77 is mounted on the rear cowl 75.

The motorcycle 10 according to the present invention has the body frame 11 that includes the first frame member 21 and the second frame member 22 wherein the first frame member 21 and the second frame member are separately disposed. The first frame member 21 extends from the head pipe 12 towards the crankcase 14 of the engine 13. The second frame member 22 is vertically disposed at the rear of the engine 13 to integrally form the pivot portion 23 of the rear swing arm 24.

Figure 2:
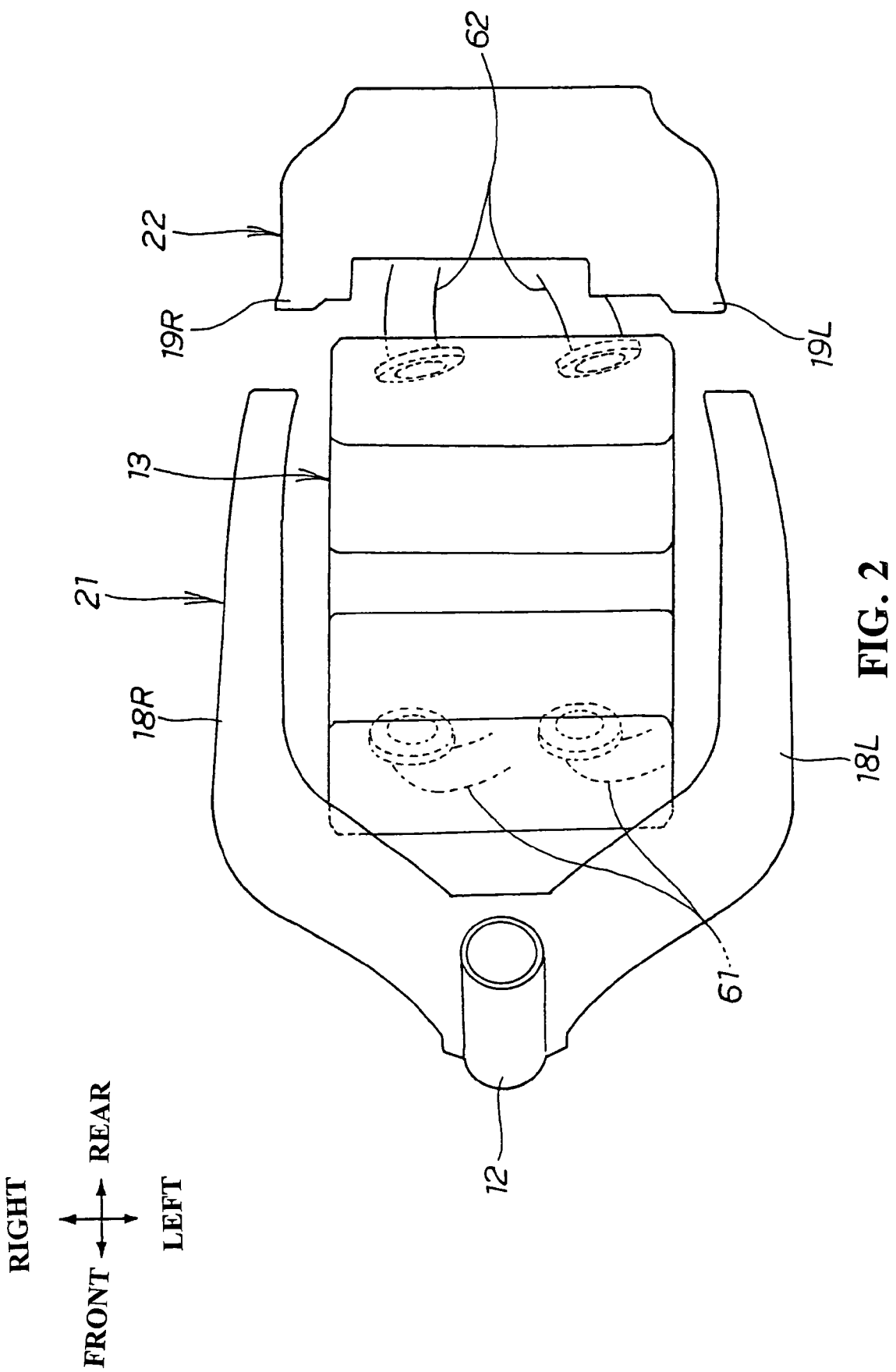
FIG. 2 is a diagram as viewed from 2 in FIG. 1.

FIG. 2 is a diagram as viewed from the arrow 2 in FIG. 1, wherein the first frame member 21 including left and right frame members 18L and 18R extend from the head pipe 12 rearwardly. The second frame member 22 includes left and right frame member 19L and 19R disposed separately from the first frame member 21. The transverse-mounted V4 cylinder engine 13 is disposed in a space surrounded by the first frame member 21 and the second frame member 22.

Figure 3:
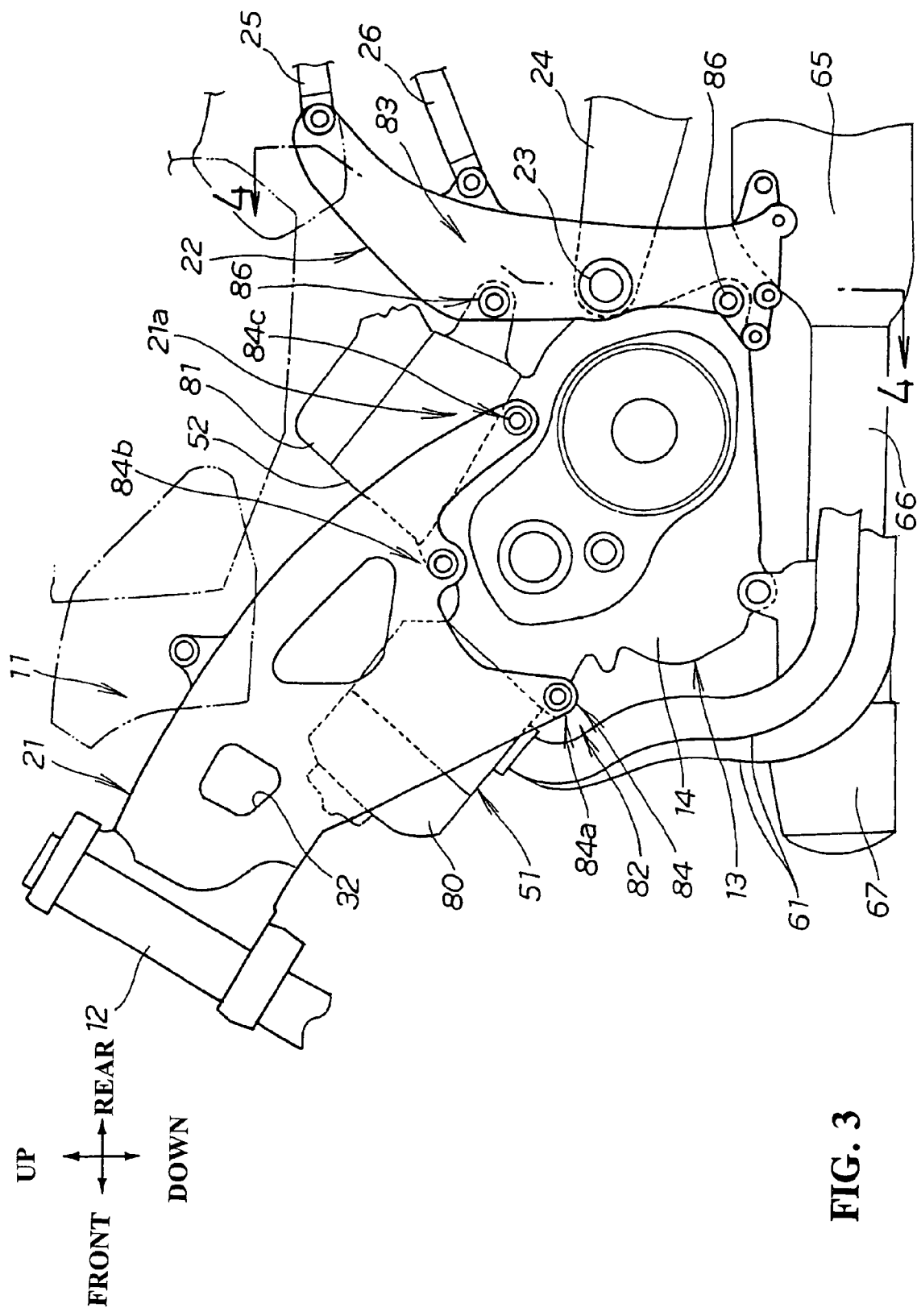
FIG. 3 is a side view of the substantial part of body frame for the motorcycle according to the present invention.

FIG. 3 is a side view of a substantial portion of the motorcycle according to the present invention.

The engine 13 is a transverse-mounted V4 cylinder engine having two front cylinders and two rear cylinders, which includes the crankcase 14, the front cylinder 51 rising obliquely forward from the crankcase 14, the front cylinder head 80 provided at the top of the front cylinder 51, the rear cylinder 52 rising obliquely rearwardly from the crankcase 14 and the rear cylinder head 81 provided at the top of the rear cylinder 52.

The suspend-support structure for the engine 13 is hereinafter described wherein one engine support 82 is formed integrally with the first frame member 21, the other engine support 83 is formed integrally with the second frame member 22. The first frame member 21 gradually expands towards the one engine support 82. Three approximately M-shaped projections 84 . . . (hereafter . . . indicates plural reference numerals) are formed at an end of the first frame member 21. The other engine support 82 is formed at these projections 84 . . . .

A front projection 84a of the projections 84 supports the front portion of the front cylinder 51 of the engine 13, a center projection 84b supports a portion between the front cylinder 51 and the rear cylinder 52, and a rear projection 84c supports the rear portion of the rear cylinder 52.

It may be said that one engine support 82 supports at least the front portion of the front cylinder 51 and the rear portion of the rear cylinder 52.

Since one engine support 82 can extensively support the front and rear portions of the engine 13, it is possible for the engine 13 to be effectively supported. Thus, even for a laterally long multiple-cylinder engine it is possible to ensure the binding rigidity effectively.

In addition, a rear support 86 is provided at the front portion of the second frame member 22 to support the crankcase 14 of the engine 13.

Since the first frame member 21 and the second frame member 22 are separately disposed, each frame becomes less bulky, making it easier to determine the mounting position accuracy for the engine 13.

In this embodiment, although the engine 13 is a V-engine having two cylinders each at the front and rear thereof, a tandem engine or a vertical-mounted inline engine may be employed.

Figure 4:
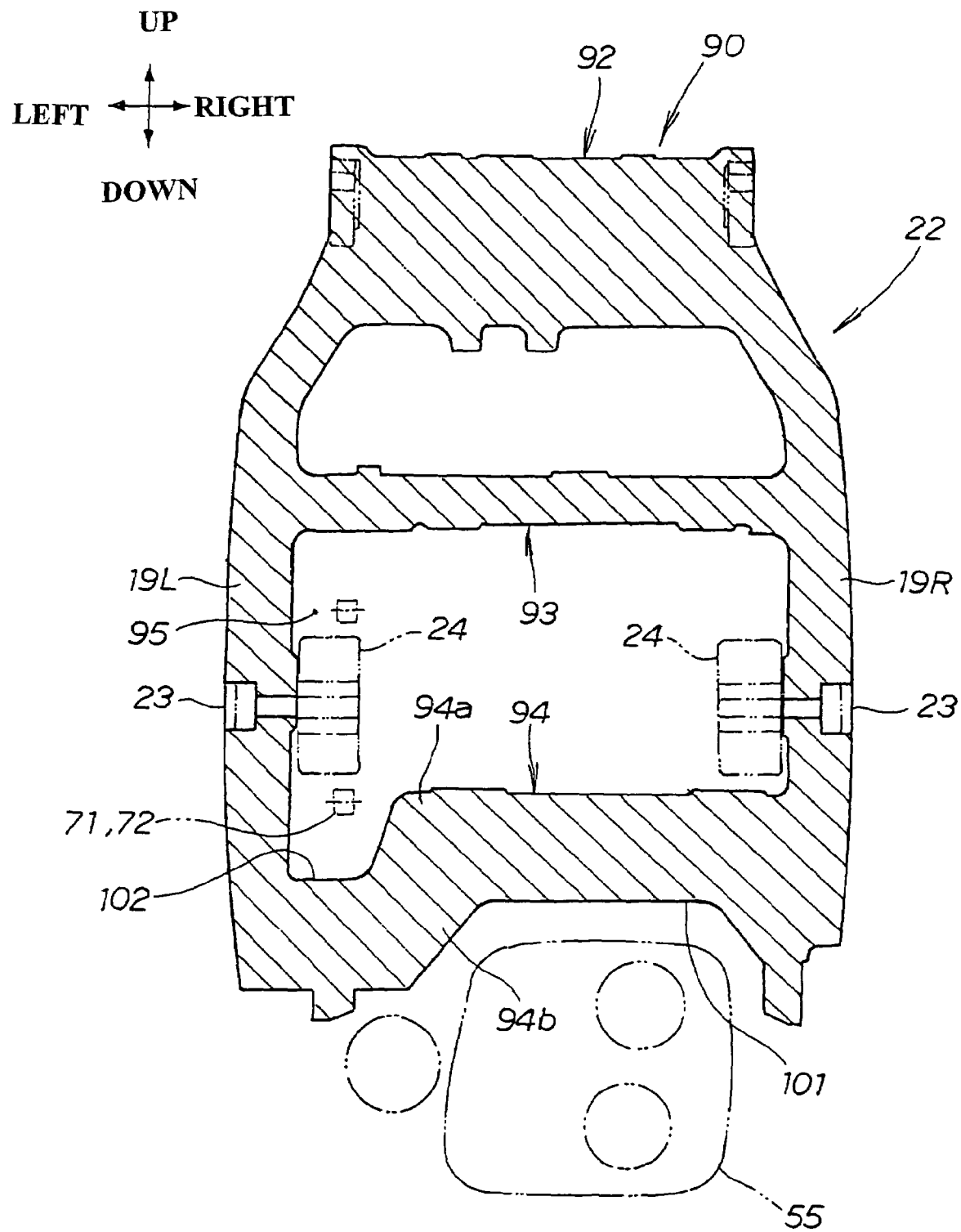
FIG. 4 is a cross-section view taken along 4-4 in FIG. 3.

FIG. 4 is a cross-section view taken along 4-4 in FIG. 3 showing a cross section of the second frame member.

The second frame member 22 is a member that includes left and right frame portions 19L, 19R, and three (upper, center, and lower) cross portions 92, 93, 94 connecting the left and right frame portions 19L, 19R.

The chain 71 as a power transmission member 72 is passed through a space 95 formed by the lower cross portion 94, the center cross portion 93, and the left and right frame portions 19L, 19R. In order to ensure the space to pass the chain 71, a second recessed portion 102 is formed in the top portion 94a of the lower cross portion 94 that is downwardly recessed.

At the bottom 94b of the lower cross portion 94, a first recessed portion 101 is formed that is upwardly recessed.

More specifically, the second frame member 22 includes the left and right frame portions 19L, 19R. The lower cross portion 94, which is one of the cross portions 90 connecting the left and right frame portions 19L, 19R, is integrally formed below the pivot portion 23. The first recessed portion 101 is formed that is upwardly recessed at the bottom 94b of the lower cross portion 94, to allow the muffler to be disposed in the first recessed 101.

Since the first recessed portion 101 is formed that is upwardly recessed, at the bottom 94b of the lower cross portion 94 that is integrally formed with the second frame member 22, it is possible to increase the flexibility in disposition of the muffler 55.

With the increased flexibility in the disposition of the muffler 55, an optimum disposition of the muffler 55 with a weight distribution and the like taken into consideration can be achieved.

In addition, the second recessed portion 102 is formed that is downwardly recessed, at the lower cross portion 94.

Since the power transmission member 72 is made to pass through the second recessed portion 102, it is possible to effectively dispose the muffler 55 and the power transmission member 72.

This makes it possible to effectively dispose the muffler 55 and the power transmission member 72, thereby allowing a disposition of the members with a high space efficiency and good weight balance.

In this embodiment, although the chain 71 is used for the power transmission member 72, a belt, a drive shaft, or a gear train may be employed.

Now, the advantages of the body frame of the motorcycle described above is described.

Referring to FIG. 3, the first frame member 21 is formed to gradually expand with the three approximately M-shaped projections 84a, 84b, 84c being formed at the end 21a of the first frame member 21. One engine support 82 is formed at the projections 84a, 84b, 84c.

If the first frame member 21 does not gradually expand, there is a limit on the extent of supporting the engine 13 at the end thereof. In order to obtain a predetermined binding rigidity, it is necessary to increase the number of support points. For example, the predetermined binding rigidity is obtained by adding, for example, a wide stay to the end 21a of the first frame member 21 to increase the number of support points for the engine 13. This will increase the number of parts and the number of man-hour for the work and assembly, resulting in an increased cost for the body frame 11.

Moreover, for the first frame member 21, if an attempt is made to simply increase the extent of supporting the engine 13 without forming the approximately M-shaped projections 84 . . . at the end thereof, the width and size of the first frame member 21 will increase, causing a problem with regard to an increase in the weight.

In this regard, since, in this embodiment, the first frame member 21 is formed to gradually expand toward the end 21a thereof and the three approximately M-shaped projections 84a, 84b, 84c are formed at the end 21a to serve as one engine support 82, it is possible to ensure the predetermined binding rigidity without having to increase the size of the body frame 11. Since the size of the body frame 11 is not increased, it is possible to reduce the weight of the body frame 11 and thereby save the cost thereof.

Also, since the three projections 84*a*, 84*b*, 84*c* are formed at the end 21*a* of the first frame member 21, so as to support the front of the front cylinder 51, the rear of the rear cylinder 52, and a portion between the front cylinder 51 and the rear cylinder 52, it is possible to increase the binding rigidity of the engine 13 effectively and in a balanced manner.

Since the extent of supporting the engine 13 can be easily ensured, it is possible to effectively ensure the binding rigidity between the engine 13 and the body frame 11, even for a relatively bulky multiple-cylinder engine.

Figure 5:
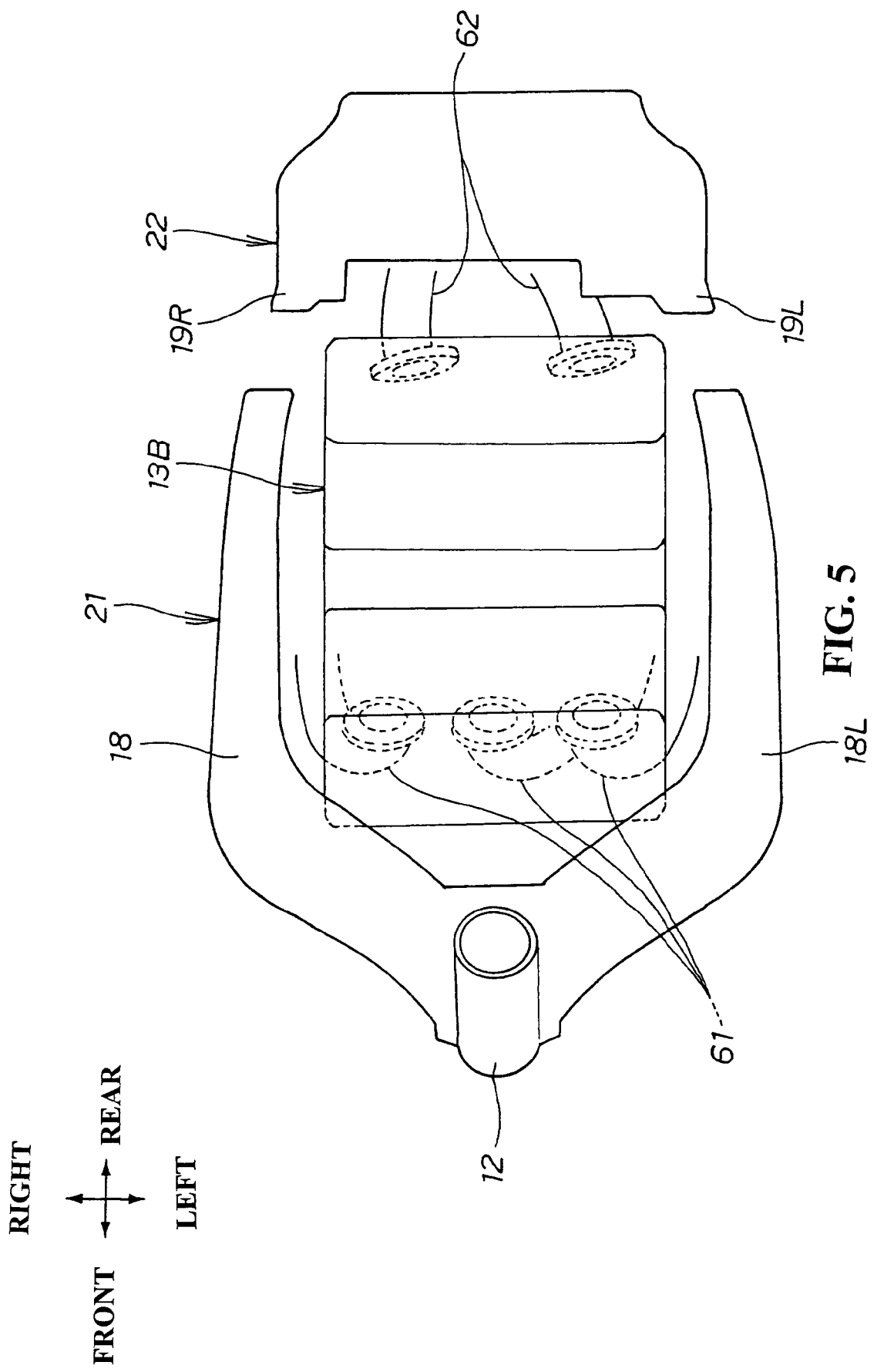
FIG. 5 is a modification of the embodiment in FIG. 2.

FIG. 5 is a modification of the embodiment in FIG. 2, wherein the engine type is changed from the one in which the engine is suspend-supported by the first frame member 21 and the second frame member 22, to the transverse-mounted V5 cylinder engine 13B in which the front three cylinders and the rear two cylinders intersect in a V-shape.

In addition, three exhaust pipes 61 . . . are made to extend from the front three cylinders by suspend-supporting the front three cylinders, the U-tube (63 in FIG. 1) where the exhaust pipes 61 . . . assemble is increased in diameter according to the engine displacement.

In the present invention, the first frame member may not be one that supports a multiple-cylinder engine, but may be one that supports a single-cylinder engine, for example. Also, the engine support may not be in front of the front cylinder or at the rear of the rear cylinder.

In the present invention, the embodiment is not restricted to the three approximately M-shaped projections formed at the end of the first frame. Approximately three W-shaped projections may be employed.

In the present invention, the power transmission member may not be passed through the recessed portion formed at the top of the cross portion. Also, the recessed portion that is downwardly recessed may not be provided at the top of the cross member. It may be made flat or convex, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame for a motorcycle comprising:
    a first frame member and a second frame member, the first frame member and the second frame member being separated relative to each other;
    the first frame member extending from a head pipe to a crankcase of an engine, said first frame member being formed integrally with at least one engine support;
    the second frame member being disposed at a rear of the engine, said second frame member being formed integrally with at least one engine support; and
    a pivot portion of a rear swing arm being operatively mounted relative to the second frame member;
    the first frame member gradually expands toward the at least one engine support wherein approximately M-shaped projections are formed at an end of the first frame member, and the at least one engine support is formed at these projections,
    wherein the second frame member includes a cross member having an upwardly formed recess therein, and further including a muffler operatively connected to said engine wherein said muffler projects upwardly and is partially disposed within said upwardly formed recess.

2. The body frame for a motorcycle according to claim 1, wherein the engine is a multiple-cylinder engine including a front cylinder and a rear cylinder;
    the first frame member gradually expands toward the at least one engine support, and three approximately M-shaped projections are formed at the end of the first frame member; and
    a front projection of these projections supports the front portion of the front cylinder, a center projection supports the portion between the front cylinder and the rear cylinder, and a rear projection supports the rear portion of the rear cylinder.

3. The body frame for a motorcycle according to claim 2, wherein the three approximately M-shaped projections are secured directly to the engine for reducing the weight and increasing the rigidity of the body frame.

4. The body frame for a motorcycle according to claim 1, wherein the at least one engine support of the first frame member is operatively connected to the engine and the at least one engine support of the second frame member is operatively connected to the engine for forming the body frame from the first frame member, the engine and the second frame member.

5. The body frame for a motorcycle according to claim 1, wherein said cross member further includes an downwardly formed recess and further including a power transmission member operatively connected between the engine and a rear wheel wherein said power transmission member is accommodated within said downwardly formed recess formed in said cross member.

6. The body frame for a motorcycle according to claim 1, wherein the engine is a multiple-cylinder engine including a front cylinder and a rear cylinder;
    the first frame member gradually expands toward the at least one engine support, and three approximately W-shaped projections are formed at the end of the first frame member; and
    a front projection of these projections supports the front portion of the front cylinder, a center projection supports the portion between the front cylinder and the rear cylinder, and a rear projection supports the rear portion of the rear cylinder.

7. A body frame for a motorcycle comprising:
    a first frame member and a second frame member, the first frame member and the second frame member being separated relative to each other;
    the first frame member extending from a head pipe to a crankcase of an engine and being formed integrally with at least one engine support;
    the second frame member extending from the rear portion of the engine toward the rear of the engine, said second frame member being formed integrally with other engine support; and
    a pivot portion of a rear swing arm being operatively mounted relative to the second frame member;
    wherein the engine is a multiple-cylinder engine comprising a front cylinder and a rear cylinder;
    the at least one engine support supports at least a front portion of the front cylinder, a rear portion of the rear cylinder, and a portion between the front cylinder and the rear cylinder,
    wherein the first frame member gradually expands toward the at least one engine support, and three approximately W-shaped projections are formed at the end of the first frame member; and
    a front projection of these projections supports the front portion of the front cylinder, a center projection supports the portion between the front cylinder and the rear cylinder, and a rear projection supports the rear portion of the rear cylinder.

8. The body frame for a motorcycle according to claim 7, wherein the at least one engine support of the first frame member is operatively connected to the engine and the at least one engine support of the second frame member is operatively connected to the engine for forming the body frame from the first frame member, the engine and the second frame member.

9. The body frame for a motorcycle according to claim 7, wherein the second frame member includes a cross member having an upwardly formed recess therein, and further including a muffler operatively connected to said engine wherein said muffler projects upwardly and is partially disposed within said upwardly formed recess.

10. The body frame for a motorcycle according to claim 9, wherein said cross member further includes an downwardly formed recess and further including a power transmission member operatively connected between the engine and a rear wheel wherein said power transmission member is accommodated within said downwardly formed recess formed in said cross member.

11. A body frame for a motorcycle comprising:
a first frame member and a second frame member, the first frame member and the second frame member being separated relative to each other;
the first frame member extending from a head pipe to a crankcase of an engine and being formed integrally with at least one engine support;
the second frame member extending from the rear portion of the engine toward the rear of the engine, said second frame member being formed integrally with another engine support;
a pivot portion of a rear swing arm being operatively mounted relative to the second frame member;
wherein the second frame member comprises left and right frame portions and a cross portion connecting the left and right frame portions is integrally formed below the pivot portion; and
a first upwardly recessed portion formed at the bottom of the cross portion wherein a muffler can be passed through the first recessed portion.

12. The body frame for a motorcycle according to claim 11, wherein a second downwardly formed recessed portion is formed at the top of the cross portion wherein a power transmission member is passed through the second recessed portion.

13. The body frame for a motorcycle according to claim 11, wherein the engine is a multiple-cylinder engine including a front cylinder and a rear cylinder;
the first frame member gradually expands toward the at least one engine support, and three approximately M-shaped projections are formed at the end of the first frame member; and
a front projection of these projections supports the front portion of the front cylinder, a center projection supports the portion between the front cylinder and the rear cylinder, and a rear projection supports the rear portion of the rear cylinder.

14. The body frame for a motorcycle according to claim 13, wherein the three approximately M-shaped projections are secured directly to the engine for reducing the weight and increasing the rigidity of the body frame.

15. The body frame for a motorcycle according to claim 11, wherein the at least one engine support of the first frame member is operatively connected to the engine and the at least one engine support of the second frame member is operatively connected to the engine for forming the body frame from the first frame member, the engine and the second frame member.

16. The body frame for a motorcycle according to claim 11, wherein the engine is a multiple-cylinder engine including a front cylinder and a rear cylinder;
the first frame member gradually expands toward the at least one engine support, and three approximately W-shaped projections are formed at the end of the first frame member; and
a front projection of these projections supports the front portion of the front cylinder, a center projection supports the portion between the front cylinder and the rear cylinder, and a rear projection supports the rear portion of the rear cylinder.

* * * * *